Aug. 3, 1965   P. GINDES ETAL   3,199,057
LOAD CELL TRANSDUCER
Filed May 3, 1963
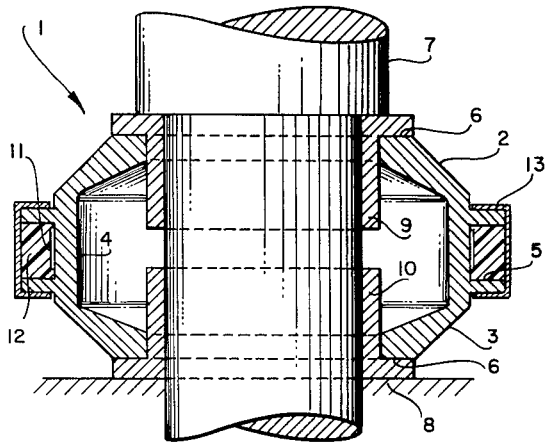
FIG_1
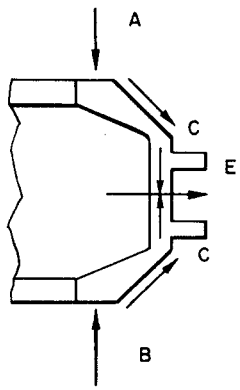
FIG_5
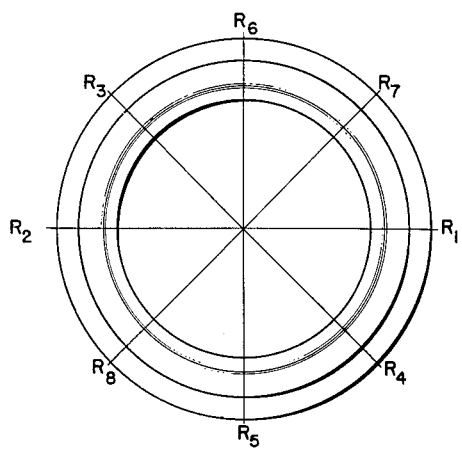
FIG_3
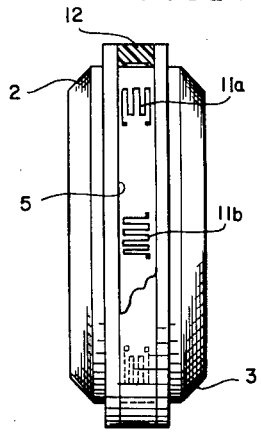
FIG_2
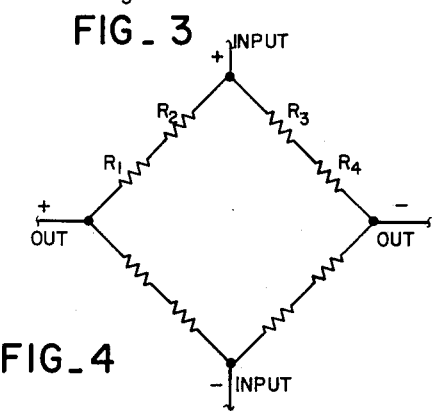
FIG_4
INVENTORS
PHILIP GINDES
KARL H. IMHOF
By George Sullivan
Agent

3,199,057
LOAD CELL TRANSDUCER

Philip Gindes, West Covina, and Karl H. Imhof, Pico Rivera, Calif., assignors to Lockheed Aircraft Corporation, Burbank, Calif.
Filed May 3, 1963, Ser. No. 277,738
4 Claims. (Cl. 338—5)

This invention relates to the field of force measurements and more particularly to a load cell transducer of the axial compressive load type.

In the measurement of axial compressive loads, it has been the conventional practice to employ transducers which are commonly known as being of a "washer" type. A load cell transducer of this type is described and claimed in United States Patent 3,036,283, granted May 22, 1962, and assigned to the same assignee as the present application. The strain sensitive wire of such transducers may be incorporated as one arm of a common Wheatstone bridge circuit and used in the conventional manner for sensing axial mechanical loads, either compressive or tensile. The device of the prior patent, cited above, provided an increased signal proportional not only to the compressive stress in the cross sectional area, but also to the moment of load around the area.

One object of the present invention is to provide a transducer which makes use of a full Wheatstone bridge for simultaneous measurements in compression and expansion of the load cell.

A further object of the invention is to provide a transducer of increased sensitivity, thereby eliminating the need for amplification at the site of the load cell installation.

These and other objects of the invention will become apparent from the following detailed description when taken in connection with the accompanying drawings in which:

FIGURE 1 is a cross section of a typical embodiment of load cell in accordance with the present invention.

FIGURE 2 is a side view of the transducer illustrating the placement of strain gages.

FIGURE 3 is a top view of the transducer indicating the gage positioning.

FIGURE 4 is an electrical schematic illustrating the connection of the gages in a bridge network.

FIGURE 5 is a profile view through one side of the transducer to illustrate the applied load forces.

With reference to FIGURE 1, a transducer 1 which comprises generally a hollow body having a shape representative of a pair of frusto-conical sections or truncated right circular cones 2 and 3 with their bases joined to opposite sides of a cylindrical portion 4. The cylindrical portion is provided with a pair of annular ring like projections integral therewith which provides an annular recess 5 for receiving a plurality of strain gages in accordance with the invention as will be described hereinafter. The truncated surfaces provide load bearing surfaces 6 at the top and bottom of the transducer. When the transducer is placed between a load applying member 7 and a fixed part 8 of a support or machine, the transducer measures the relative force between the two. Load bearing sleeves 9 and 10 may be utilized between the transducer and the members to which it is attached, a plurality of strain gages 11 are cemented or bonded to the bottom of the recess 5, and connected in a preferred pattern, to be described and then the recess is filled with potting compound or the like 12, completely encapsulating the gage area. If desired, a cover 13 may be used to enclose the gage area for protection against damage.

With reference to FIGURES 2 and 3, a typical arrangement of the gages is shown. While not limited thereto, the individual strain gages 11 may be constructed of etched foil or in any conventional manner. As illustrated, the sensitive element is comprised of eight (8) strain gages equally spaced around the cylindrical portion 4, and it is preferred that alternate gages have their sensitive axis disposed at right angles to each other. In other words, as seen in FIGURE 2, the gage 11a is placed with its strain axis in line with the expansion or hoop stress, whereas gage 11b has its strain axis at 90° thereto or in line with the compressive stress. As will be noted by a comparison with FIGURE 3, the gages diametrically opposite each other are similar as to axis disposition.

Now with reference to FIGURE 4, the eight gages are connected in a full Wheatstone bridge circuit in such manner that the forces caused by compression of the load cell and those forces resulting from expansion of the cell become additive, resulting in four times the output of that experienced with the use of only one wire. It will be noted that each arm of the bridge is comprised of the resistance of two gages, and with reference back to FIGURE 3, these two gages are diametrically opposite to each other and have their strain axes parallel to each other.

It is of course understood that the connections shown in FIGURE 4 are made during the assembly of the strain gages on the cell and then the gages and connecting wires are embedded in the potting compound 12.

The unique features of this invention will be further appreciated by reference to FIGURE 5, which illustrates the loading on the cell and the resulting forces as vectorial quantities. The load is applied along the vectors A and B which passes through the cell body and results in one vector C which causes a compressive force in the cylindrical portion of the cell, and the other vector E which causes an expansion of the cell along the periphery. The use of the conventional one wire gage such as disclosed in the aforementioned patent measures only the resultant E or expansion force, and of course is inadequate for many applications.

One particular environment where the present invention is very useful is in oilwell operation where the cell is used to measure the weight of a pump sucker rod during pumping cycles. The ruggedness of this invention and the high output make this device particularly suitable for such applications where amplifiers adjacent the cell are impractical.

While a specific embodiment of the invention has been shown and described it should be understood that certain alterations, modifications and substitutions may be made to the instant disclosure without departing from the spirit and scope of the invention as defined by the appended claims.

What is claimed is:

1. An electro-mechanical force sensitive element comprising a pair of frusto-conical sections, a cylindrical portion joining the bases of said sections to provide a hollow body, the narrow end portion of the frusto-conical sections lying about the central axis of the body and extending outwardly away from the cylindrical portion, a flat load-bearing surface at each narrow end portion, the walls of said sections being thicker adjacent said flat load bearing surface than at the junction of said sections and the cylindrical portion, a pair of annular rings integral with the cylindrical portion adjacent the bases of said sections and spaced slightly from the junction of said sections and the cylindrical portion, a series of at least eight strain sensitive elements bonded to the cylindrical portion between said annular rings, alternate elements having their sensitive axis disposed at right angles to each other, and diametrically opposed elements having the same sensitive axes, and means for connecting said elements for use in a bridge circuit, each arm of said bridge consisting of two series-connected diametrically opposed elements.

2. The invention as defined by claim 1, further including means for encapsulating said sensitive elements.

3. An electro-mechanical force sensitive device comprising a hollow body having opposite load-bearing surfaces and including a pair of frusto-conical sections and a cylindrical section integrally joining the wide end portions of the frusto-conical sections, the narrow end portion of said sections forming said opposite load bearing surfaces, the walls of said sections having a thickness increasing from the wide end toward the narrow end of the sections, a pair of annular rings surrounding and integral with the cylindrical section adjacent and spaced from the junctions of the cylindrical section and said frusto-conical sections, at least a minimum of four pairs of strain gages evenly spaced around and bonded to the cylindrical section and between said rings, each pair consisting of diametrically opposed elements having parallel strain sensitive axes, and wherein alternate strain gages have the strain sensitive axis in line with the hoop stress and the gages inbetween have the strain sensitive axis in line with the compressive stress.

4. The invention as defined by claim 3, and further including means for connecting said strain gages in a bridge circuit.

References Cited by the Examiner
UNITED STATES PATENTS

| | | | |
|---|---|---|---|
| 3,036,283 | 5/62 | Singdale | 338—5 |
| 3,088,083 | 4/63 | Ward | 338—5 |
| 3,151,306 | 9/64 | Hines | 338—5 |

RICHARD M. WOOD, *Primary Examiner.*